April 30, 1957 G. A. LYON 2,790,681
WHEEL COVER
Filed Dec. 19, 1951 3 Sheets-Sheet 2

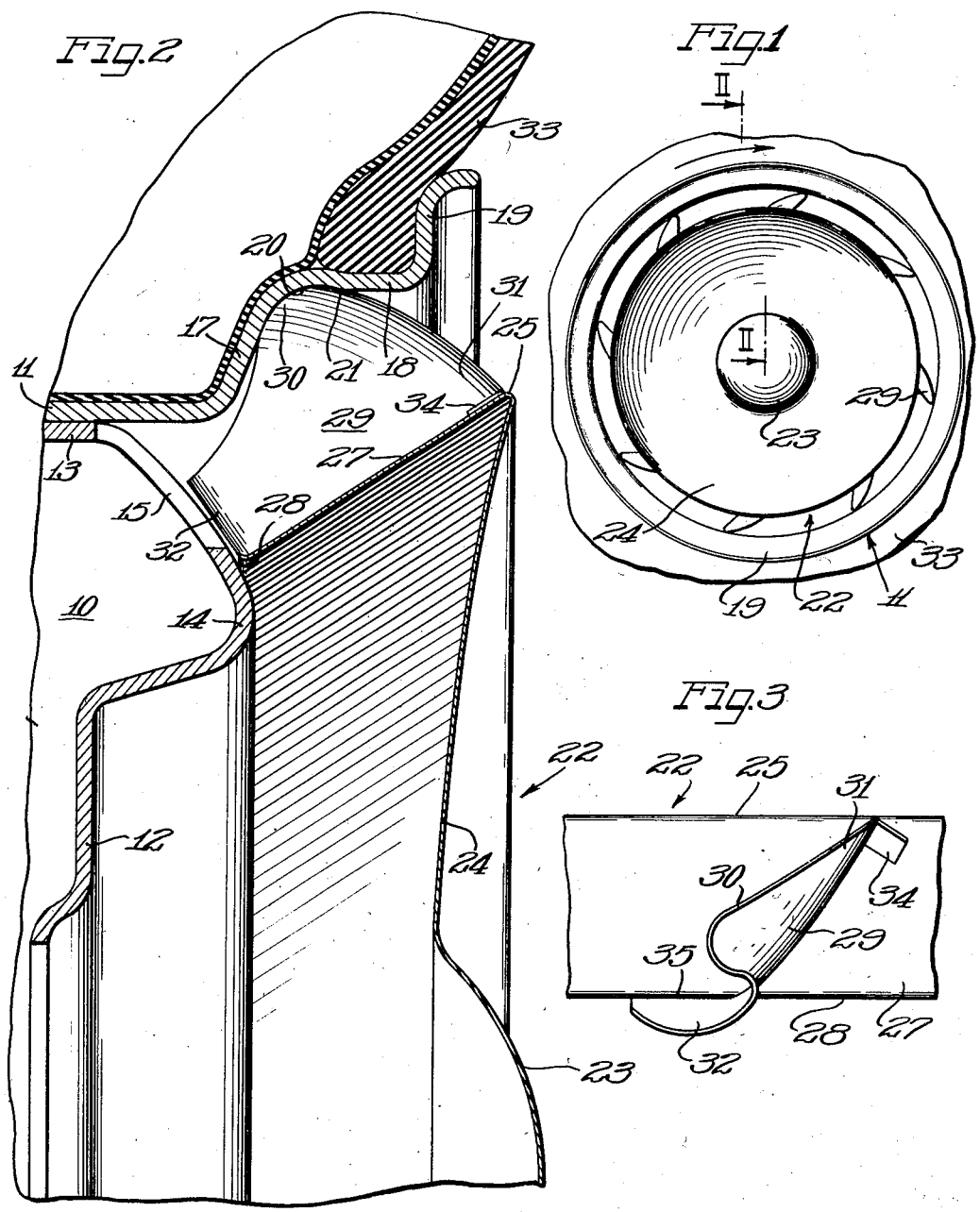

Inventor:
George Albert Lyon
by Hill, Sherman, Meroni, Gross & Simpson
Attys

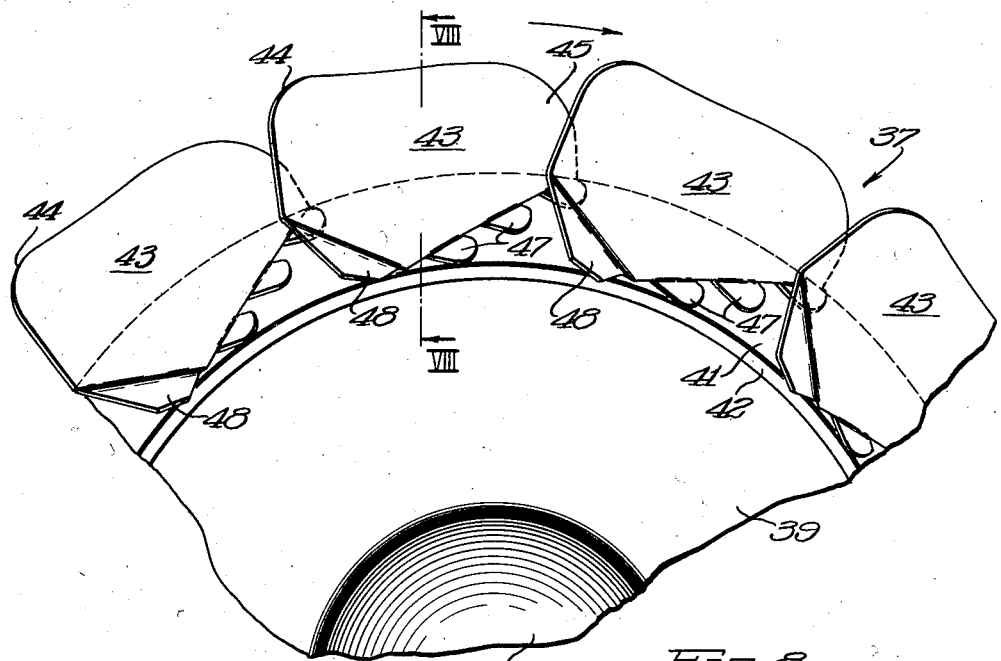
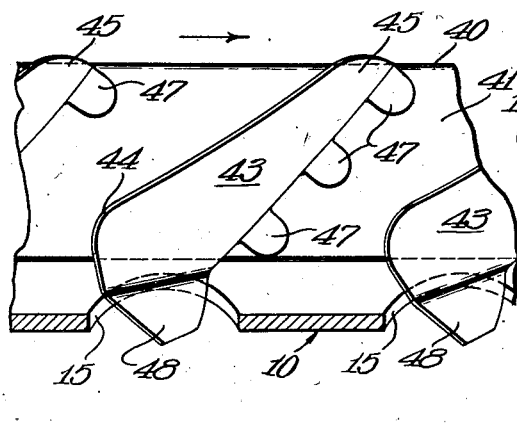
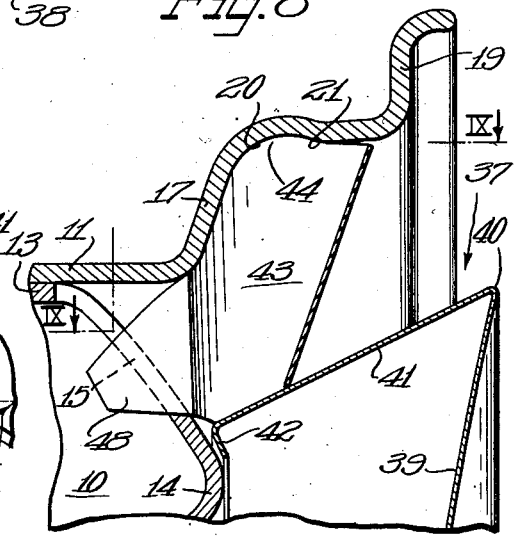
Inventor:
George Albert Lyon

United States Patent Office 2,790,681
Patented Apr. 30, 1957

2,790,681

WHEEL COVER

George Albert Lyon, Detroit, Mich.

Application December 19, 1951, Serial No. 262,443

12 Claims. (Cl. 301—37)

The present invention relates to improvements in wheel structures and more particularly concerns the ornamental and protective covering of the outer sides of vehicle wheels in which cooling air circulation through the wheels is an important factor.

In the development of improved brake structures for automotive vehicles, the problem of dissipation of heat generated during operation of the brakes is a very important problem. This problem is aggravated by the fact that the wheels have been substantially reduced in diameter to accommodate large size tires, and further by the increase in diameter of the tires to the currently popular balloon size. Therefore the air which moves past the wheels in service, moves in a slip stream past the brake drum associated with the wheel without adequate cooling effect.

It is accordingly an important object of the present invention to provide a wheel structure having improved means for effecting circulation of cooling air through the wheel.

Another object of the invention is to provide a wheel structure having novel cover means for the outer side of the wheel including structure to promote air circulation through openings in the wheel.

A further object of the invention is to provide a novel cover structure for the outer side of vehicle wheels including self-retaining and air circulation promoting means.

According to the general features of the invention there is provided in a wheel structure including a multi-flanged tire rim and a wheel body providing wheel openings for air circulation therethrough, a cover for the outer side of the wheel comprising a generally hat-shaped body of a diameter to cover the wheel body and a portion of the tire rim but affording a uniform annular air circulation gap between the cover body and the tire rim, the cover having a series of air circulation promoting fins or vanes projecting generally radially about the outer margin of the cover and having axially outer portions exposed at the outer side of the wheel for diverting air toward the inside of the wheel for circulation through said openings in the rotation of the cover with the wheel.

According to other features of the invention the air circulation promoting vanes of the cover have radially outwardly extending portions retainingly engaging the tire rim to hold the cover on the wheel.

According to further features of the invention, the vanes have means at their axially inner portions for directing the air effectively into the wheel openings.

According to additional general features of the invention, there is provided a wheel cover for disposition at the outer side of a vehicle wheel, the cover comprising a generally circular hat-shaped body having generally radially directed and uniformly angularly tilted fins or vanes having axially outer and axially inner portions extending radially beyond the adjacent portions of the cover body for promoting air circulation in a generally axial direction in the rotation of the cover.

It is also a feature of the invention to have the vanes formed in one piece with the cover body.

Another feature of the invention resides in forming the cover body and the vanes separately and securing the vanes to a peripheral portion of the cover body.

Other objects, features and advantages of the present invention will be readily apparent from the following detailed description of certain preferred embodiments thereof taken in conjunction with the accompanying drawings, in which:

Figure 1 is a side elevational view of a vehicle wheel having thereon a cover according to the present invention;

Figure 2 is an enlarged radial sectional view taken substantially on the line II—II of Figure 1;

Figure 3 is a fragmentary edge plan view of the cover of Figures 1 and 2;

Figure 7 is a fragmentary rear elevational view of a modified form of the cover;

Figure 8 is a fragmentary radial sectional view through the cover of Figure 7 taken substantially on the line VIII—VIII of Figure 7 and showing the cover as applied to a vehicle wheel; and Figure 9 is a fragmentary sectional detail view taken substantially on the line IX—IX of Figure 8 and showing the edge of the cover in plan.

As shown on the drawings:

Figure 4:
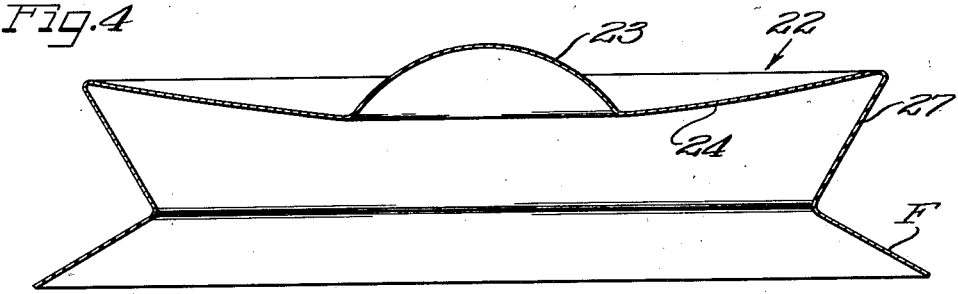
Figure 4 is a diametrical sectional view through the cover of Figures 1 and 2 showing a preliminary step in making the cover.

The present invention may be applied to a vehicle wheel including a wheel body 10 and a tire rim 11. The wheel body may be of any suitable configuration and may, as is current practice, be stamped from a disk of suitable heavy gauge sheet metal to provide a central bolt-on flange 12 by which the wheel is attached to the outer side of a brake drum of a vehicle. At its outer margin the wheel body is provided with an attachment flange 13 while intermediate the bolt-on flange 12 and the attachment flange 13, the wheel body may be provided with an annular outwardly bulging reinforcing nose portion 14. At suitable intervals in the wheel body adjacent to the attachment flange 13, are provided air circulation openings 15 in an annular series of suitable number.

The tire rim 11 is of the multi-flanged drop center type having the base flange thereof attached to the attachment flange 13 of the wheel body. From the base flange extends generally radially and axially outwardly a side flange 17 which merges with an intermediate generally axially extending flange 18 joining a terminal flange structure 19. In the present instance, at juncture of the intermediate flange with the side flange 17 is provided an annular radially inwardly opening groove 20 defined at its axially outer side by a shoulder 21 facing generally axially and radially inwardly.

Disposed in substantially covering relation to the outer side of the wheel is a cover 22. The cover comprises a circular body of substantially hat-shape including a small diameter central convex crown portion 23 and an annular shallow dished generally radially outwardly extending portion 24 that extends from merger with the crown 23 generally radially and axially outwardly.

The cover body portion 24 is of a maximum diameter somewhat less than the diameter of the tire rim and in the present instance of smaller diameter than the inside diameter of the intermediate flange 18. Merging on a small radius annular reinforcing rib 25 is an annular underturned generally frusto-conical marginal flange 27 extending generally axially and radially inwardly behind the cover body portion 24. As will be best observed in Figure 2, the flange 27 is angularly disposed substantially complementary to a plane touching the shoulders between respectively the tire rim base flange and the side flange 17 and between the intermediate flange 18 and the terminal flange structure 19 so that when the cover is on the wheel, a substantial annular gap of fairly uniform width is provided between the cover flange 27 and the tire rim. The arrangement is such that the inner edge of the flange 27 in the assembly with the wheel is located at the radially inner side of the wheel openings 15. For reinforcing purposes, the inner marginal extremity of the cover flange 27 is provided with a preferably generally radially outturned reinforcing terminal or lip flange 28.

For not only retaining the cover 22 on the wheel, but also for promoting air circulation through the annular space between the cover and the tire rim and through the wheel openings 15, the cover is provided with a uniform series of fin or vane members 29 which face generally circumferentially and divide the gap between the cover portion 27 and the tire rim into a plurality of sections communicating with the wheel openings 15 at the inner side of the gap and opening outwardly from between the tire rim and the cover at the outer side of the gap.

Each of the vane members 29 has a generally radially outwardly projecting intermediate rounded retaining nose or shoulder portion 30 generally complementary in shape to the groove 20 and engageable retainingly within the groove behind the shoulder 21 for retaining the cover on the wheel. An axially outer portion of the vane 29 extends to substantially the reinforcing juncture rib 25 of the cover. An axially inner end portion 32 of the vane 29 is disposed adjacent to the inner marginal extremity 28 of the flange 27 of the cover and preferably projects axially inwardly and radially outwardly therebeyond. It will be observed that the depth of the cover as determined by the flange 27 and the vanes 29 is, in the present instance, preferably such that the axially outward projection of the cover including the peripheral rib 25 is greater than the edge of the tire rim terminal flange 19 but less than the outward projection of a pneumatic tire 33 carried by the tire rim 11.

Figure 5:
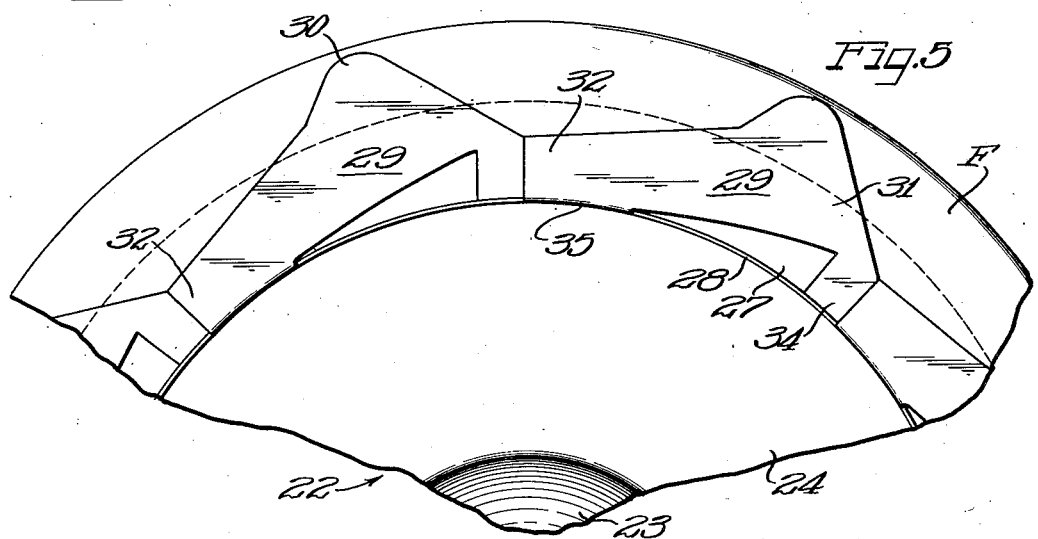
Figure 5 is a fragmentary enlarged rear elevational view of the cover of Figure 4 showing a further step in the making of the cover.
Figure 6:
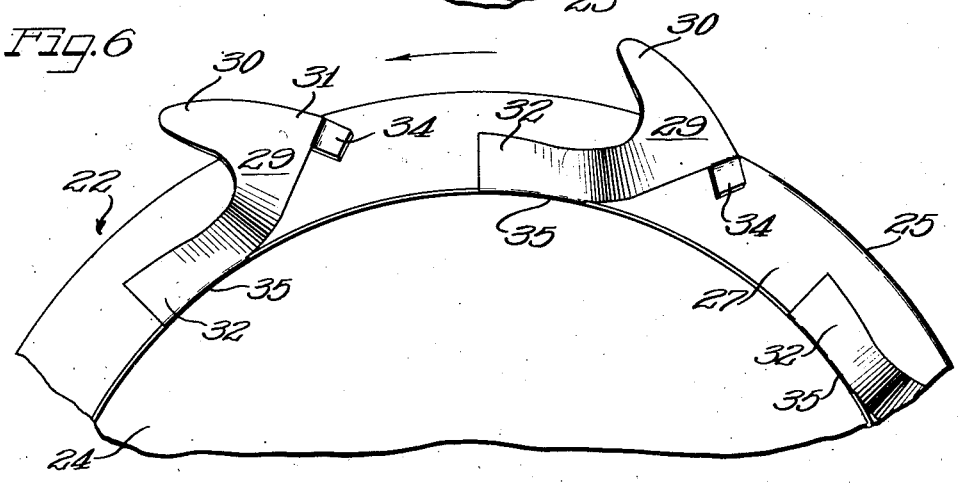
Figure 6 is a fragmentary rear elevational view of the cover similar to Figure 5 and showing the completed cover.

Having reference to Figures 4, 5 and 6, a method of making the cover retaining and air circulating vanes 29 integral in one piece with the body of the cover 22 is depicted. To this end, the cover is made all in one piece from a suitable gauge of thin sheet metal, such as stainless steel or the like, and in the initial shaping of the cover there is provided a flange F integral in one piece and flaring from the inner margin of the underturned outer side flange 27 of the cover. The vanes 29 are then cut in this flange F substantially as shown in Figure 5 with the vanes initially lying end to end with the portions 32 thereof adjoining but separated from the attachment tabs 34 integral with the portions 31 of the vanes while the retaining shoulders 30 of the tabs are disposed adjacent to the outer extremity margin of the flange F. Each of the vanes 29 is attached integrally throughout a limited marginal portion 35 at the portions 32 thereof to the inner margin of the flange 27.

Following stamping of the vanes 29 from the flange F, the vanes 29 are bent into position wherein the axially outer portions 31 of the vanes lie contiguous the marginal rib 25 of the cover, and the respective attachment tabs 34 of the vanes are attached to the back of the flange 27 as shown in Figure 6. The bending up of the vanes 29 causes the same to warp into somewhat curved form defining a substantially scoop-like relationship to the flange 27, the angle of the respective vanes being generally spirally disposed relative to the axis of the cover. The generally spiral angular relationship of the vanes 29 is preferably so arranged that the vanes will scoop air inwardly behind the cover when the cover is rotated to carry the vanes around with the shoulder portions 30 in an advancing direction, as indicated by the directional arrows in Figures 1 and 6.

In order to enhance the air scooping qualities of the vanes 29, the shouldered portions 30 thereof are angled fairly obliquely relative to the cover flange 27 and the axially inner portions 32 of the vanes are funneled generally axially inwardly and radially outwardly as shown in Figure 3. This affords a substantially reinforced, resiliently tensionable vane structure which will not only thoroughly retain the cover on the wheel but operate efficiently for promoting air circulation in the rotation of the cover in the scooping direction of the vanes.

In applying the cover to the wheel, the rounded vane shoulders 30 are engaged against the shoulder at juncture of the intermediate flange 18 with the terminal flange 19 of the tire rim. Then the cover is pressed axially inwardly and the vane shoulders 30 which are of preferably initially greater diametrically projecting extent than the internal diameter of the groove 20, cam inwardly along the intermediate flange 18 and gradually cramp into increased resiliently tensioned relation and eventually snap into the groove 20 behind the shoulder 21 on the tire rim, but yet under resilient tension acting to stress the shoulders 30 tightly against the tire rim for holding the cover firmly in place.

By preference, the inner extremity 28 of the cover flange 27, and the vane axially inner portions 32 are arranged to clear the wheel body in the fully assembled relation of the cover on the wheel so that the cover is independent of the wheel body and more particularly of any manufacturing tolerance with relation to the wheel body and the tire rim and will not be affected by such tolerance since the cover is supported entirely by the tire rim. On the other hand, the marginal underturned flange 27 serves as a closure or barrier against entry of dirt into the chamber defined between the cover and the wheel body. It will be observed that the turned lip flange 28 diverts air from the gap between such flange and the wheel body, thereby assisting in keeping dirt from coming into the chamber behind the cover.

Removal of the cover is effected by prying the same axially outwardly to cause the retaining shoulders 30 of the vanes 29 to yield and cam out of the groove 20 and pass the shoulder 21 on the tire rim. By reason of the resilient uniform engagement of the several vanes 29 with the tire rim, the cover is substantially floatingly supported on the wheel, in a radial sense. That is when the cover is stressed radially the vanes at the opposite side of the cover from the point of stress can yield while the vanes adjacent the point of stress expand but tend to remain in engagement with the tire rim until the cover is deliberately pried free from the wheel.

As the wheel rotates in service, the vanes 29, the widest parts of which are adjacent the axially outer portions 31, effectively scoop air into the space between the cover and the tire rim and direct the air axially inwardly through the wheel openings 15 toward and into cooling, circulating relation to the brake drum of the vehicle with which the wheel is used.

In a modified form as shown in Figures 7, 8 and 9, a cover 37 is provided which has the retaining and air circulation vanes or fins formed separately from the cover body and attached thereto. To this end, the cover 37 comprises a body which may be substantially the same structure as the body of the cover 22, comprising a crown portion including a central protuberance 38 encircled by a generally radially and axially outwardly directed dished annular portion 39 having juncture on a small radius acute angle rib 40 with an underturned flange 41 of generally frusto-conical shape extending axially and radially inwardly behind the cover crown portion 39. At its inner margin, the flange 41 in the present instance may be provided with an inturned annular reinforcing terminal flange 42. Secured to the outer side of the flange 41 is a series of retaining and air circulating fins or vanes 43.

Each of the vanes 43 comprises an elongated body portion having a radially outwardly projecting rounded retaining shoulder 44 which is engageable in the groove 20 of the tire rim behind the retaining shoulder 21. The profile shape of the shoulder portion 44 is substantially complementary to the cross-sectional shape of the groove 20. At its axially outer end portion 45 each of the vanes 43 lies closely adjacent to the marginal extremity rib 40 of the cover.

For attaching the vanes 43 to the cover, each is provided with a plurality, herein 3 integral angular tabs 47 which are attached as by spot-welding or the like to the outer side of the cover flange 41. The vanes are, of course, attached in oblique angles both with respect to the radius of the cover and the axis of the cover on substantially spiral lines and each of the vanes is spaced substantially apart uniformly about the periphery of the cover for promotion of air circulation as the cover is turned in the direction indicated by the directional arrows in Figures 7 and 9.

An additional feature of the vanes 43 is the provision of means for not only promoting the entry of air into the wheel openings in the wheel body, but also for holding the cover against turning on the wheel. Thus, at their axially inner end portions, the vanes are provided with respective projections 48 each comprising a generally polygonal flange or tail tapering toward the extremity for engaging efficiently within one of the wheel openings. It will be appreciated, of course, that the number and spacing of the wheel openings and the number and spacing of the vanes will thus have to be coordinated.

By having the tail flanges 48 angled obliquely relative to the general plane of the respective vane 43 generally axially and divergently relative to the normal direction of the body portion of the vane, it will be observed that air that is scooped into the space between vanes and between the flange 41 and the tire rim in the operation of the wheel will be directed by the tail flange 48 into the associated wheel opening and will thus be effective to cool a brake drum behind the wheel body.

In applying the cover 37, the retaining shoulders 44 are applied against the tire rim at juncture of the intermediate and terminal flanges and the cover then pressed inwardly to cause the vane shoulders 44 and the vane bodies adjacent thereto to flex as the shoulders 44 cam inwardly along the intermediate flange of the tire rim until the shoulders 44 snap behind the retaining shoulder 21 on the tire rim into the groove 20. Even when thus engaged, the shoulder portions 44 at least will be maintained under resilient tension to effect a strong grip resisting axial displacement of the cover. At the axially inner edges defining the shoulders 44 the vanes engage against the side flange of the tire rim to define the axially inward limit of the cover and also to assist in maintaining the vanes under cramping tension on the tire rim. Pry-off of the cover is effected similarly as described in connection with the cover 22. The tail flanges 48 aligned with and entered into the wheel openings hold the cover against turning and also assist in directing air behind the wheel for brake drum cooling purposes.

It will be understood that modifications and variations may be effected without departing from the scope of the novel concepts of the present invention.

I claim as my invention:

1. In a wheel structure including a tire rim and a wheel body having air circulation openings therethrough adjacent to the tire rim, a cover for the outer side of the wheel including a cover body and a plurality of air circulation promoting vanes at the radially outer margin of the cover obliquely disposed with respect to the cover body and having axially outer portions for scooping air into the space behind the cover, each of said vanes having an axially inner tail portion angularly disposed relative to the body of the vane and projecting into a respective opening to promote movement of the air scooped by the vanes into said openings for movement behind the wheel.

2. In a cover for disposition at the outer side of a vehicle wheel, a cover body having a generally axially and radially inwardly extending annular flange behind its margin, and a plurality of vanes extending generally radially outwardly from said flange, said vanes comprising integral extensions of the inner extremity of said flange bent up and attached to the flange adjacent to juncture of the flange with the remainder of the cover.

3. In a wheel cover for disposition at the outer side of a vehicle wheel, a cover body having a generally axially extending inturned annular flange, and a plurality of vanes projecting generally radially outwardly and having a plurality of tabs thereon attached to said flange.

4. In a cover for disposition at the outer side of a vehicle wheel, a cover body, said cover body having at the outer margin thereof a plurality of obliquely disposed vanes, each of said vanes having an axially outer air scooping portion and an axially inner tail flange portion funneled generally axially inwardly and radially outwardly.

5. In a cover for disposition at the outer side of a vehicle wheel, a cover body, said cover body having at the outer margin thereof a plurality of obliquely disposed vanes, each of said vanes having an axially outer air scooping portion and an axially inner tail flange portion funneled generally axially inwardly and radially outwardly, said tail flange portion being integrally joined to the cover body.

6. A wheel cover comprising a sheet material crown portion having a generally axially and radially inwardly extending annular underturned marginal flange and a series of vane members attached adjacent to one end integrally at a juncture bend with the inner margin of the underturned flange, said vane members being bent into edgewise generally radially projecting relation to the radially outer side of said underturned flange and the end portions of said vane members being secured to said underturned flange adjacent juncture of the flange with the crown.

7. In a wheel cover for disposition at the outer side of a vehicle wheel, a cover body having a generally axially extending inturned annular flange, and a plurality of individual vanes projecting generally radially outwardly and having respective tabs thereon attached to said flange.

8. For disposition at the outer side of a vehicle wheel, a cover including a circular body having projecting behind the outer margin thereof a generally axially inwardly extending annular flange of substantial width and imperforate and spaced from the cover body, said flange being adapted to afford an air gap with a tire rim of a wheel to which the cover may be applied, and a circumferential series of generally radially outwardly projecting and circumferentially facing air motivating vanes on the radially outer face of said flange, said vanes having angular attachment flanges secured in face-to-face relation to said face.

9. In a wheel structure including a tire rim and a wheel body with air circulation openings adjacent juncture of the body and rim, a cover for disposition at the outer side of the wheel including a circular cover body for overlying the wheel body in spaced relation and having a marginal portion thereof for overlying the tire rim in spaced relation, said marginal portion having therebehind a generally axially inwardly extending continuous annular imperforate flange of substantially smaller diameter than opposing portions of the tire rim so as to provide an air gap between the flange and the tire rim and with the inner extremity of the flange of a diameter to closely oppose the wheel body radially inwardly from the wheel openings so as to afford substantial closure between the wheel body and the cover body against entry of dirt behind the cover body and to the inner portion of the wheel body, and a series of generally radially outwardly projecting and circumferentially facing resilient cover retaining and air circulation vanes having marginal portions secured to and thereby carried by the radially outer face of said flange and retainingly resiliently tensionably engageable with the tire rim in press-on, pry-off relation for retaining the cover on the wheel and for promoting air circulation movement through said gap and said wheel openings.

10. In a cover for disposition at the outer side of a vehicle wheel, a circular cover body having a radially outer annular marginal portion provided with a generally radially outwardly facing face arranged to afford an air gap with a tire rim with which the cover may be assembled, said annular portion having a circumferentially spaced series of vane extensions from an edge thereof bent back along respective edges of the vanes into engagement with said face of said portion and having attachment flanges secured thereto, said vanes projecting generally radially outwardly and facing generally circumferentially for air motivating projection into said gap.

11. In a cover for disposition at the outer side of a vehicle wheel, a circular cover body having a radially outer annular marginal portion provided with a generally radially outwardly facing face arranged to afford an air gap with a tire rim with which the cover may be assembled, said annular portion having a circumferentially spaced series of vane extensions from an edge thereof bent back along respective edges of the vanes into engagement with said face of said portion and with marginal portions of the vanes secured thereto, said vanes projecting generally radially outwardly and facing generally circumferentially for air motivating projection into said gap said annular portion comprising a flange extending generally axially inwardly behind the cover body and spaced therefrom.

12. In a wheel structure including a tire rim and a wheel body having openings therein adjacent juncture with the tire rim and defined by edge portions that face generally circumferentially, a cover for disposition at the outer side of the wheel having portions thereon for retaining engaging the tire rim to hold the cover in predetermined axial disposition on the wheel, and other portions engageable with said generally circumferentially facing edges and operative to retain the cover against turning.

References Cited in the file of this patent

UNITED STATES PATENTS

| | | |
|---|---|---|
| 2,148,211 | Lyon | Feb. 21, 1939 |
| 2,265,938 | Eksergian | Dec. 9, 1941 |
| 2,308,618 | Lyon | Jan. 19, 1943 |
| 2,368,228 | Lyon | Jan. 30, 1945 |
| 2,633,944 | Butterfield | Apr. 7, 1953 |

FOREIGN PATENTS

| | | |
|---|---|---|
| 787,597 | France | Sept. 25, 1935 |

OTHER REFERENCES

Brake Service, vol. 21, No. 5, May 1951, page 14.